United States Patent
Peebler (10) Patent No.: US 7,574,388 B1
(45) Date of Patent: Aug. 11, 2009

(54) TIME MARKET GRID INTERFACE

(75) Inventor: Simeon C. Peebler, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 405 days.

(21) Appl. No.: 11/144,134

(22) Filed: Jun. 3, 2005

(51) Int. Cl.
*G06Q 40/00* (2006.01)

(52) U.S. Cl. .............................. 705/35; 705/36; 705/37; 705/38

(58) Field of Classification Search ........................ None
See application file for complete search history.

(56) References Cited

U.S. PATENT DOCUMENTS

| | | | |
|---|---|---|---|
| 5,297,031 A * | 3/1994 | Gutterman et al. | 705/37 |
| 5,689,651 A * | 11/1997 | Lozman | 705/37 |
| 6,408,282 B1 * | 6/2002 | Buist | 705/36 R |
| 6,766,304 B2 * | 7/2004 | Kemp et al. | 705/36 R |
| 6,938,011 B1 * | 8/2005 | Kemp et al. | 705/37 |
| 6,993,504 B1 | 1/2006 | Friesen | |
| 7,127,424 B2 * | 10/2006 | Kemp et al. | 705/37 |
| 7,212,999 B2 * | 5/2007 | Friessen et al. | 705/37 |
| 7,228,289 B2 * | 6/2007 | Brumfield et all. | 705/35 |
| 2002/0073017 A1 * | 6/2002 | Robertson | 705/37 |
| 2003/0004853 A1 * | 1/2003 | Ram et al. | 705/347 |
| 2003/0009411 A1 * | 1/2003 | Ram et al. | 705/37 |
| 2005/0283415 A1 * | 12/2005 | Studnitzer et al. | 705/35 |
| 2006/0020538 A1 | 1/2006 | Ram | |
| 2006/0059083 A1 | 3/2006 | Friesen | |
| 2006/0069635 A1 | 3/2006 | Ram | |
| 2007/0156565 A1 | 7/2007 | Singer | |

OTHER PUBLICATIONS

Unpublished U.S. Appl. No. 11/416,399, System and Method for Icon Oriented Representation of Trading Strategies, Inventor Alvin F. Tanpoco.
Unpublished U.S. Appl. No. 11/415,888, System and Method for Icon Oriented Representaion of Trading Strategies, Inventor Alvin F. Tanpoco.
Unpublished U.S. Appl. No. 11/409,346, System and Method for Dynamically Determining Quantity for Risk Management, Inventor Alivn F. Tanpoco.
Unpublished U.S. Appl. No. 11/417,873, System and Method for Dynamically Determining Quantity for Risk Management, Inventor Alivn F. Tanpoco.
Unpublished U.S. Appl. No. 10/609,869, System and Method for Timed Order Entry and Modification, Inventors Fishbain, Mintz, and Murphy.

* cited by examiner

*Primary Examiner*—Harish T Dass
*Assistant Examiner*—Benjamin S Fields
(74) *Attorney, Agent, or Firm*—McDonnell Boehnen Hulbert & Berghoff LLP (57) ABSTRACT

A system and method are provided for trading a tradeable object. One example apparatus includes a microprocessor, a graphical user comprising a first screen region having a plurality of locations in the first screen region, each location corresponding to a price level along a first axis and a time along a second axis. The apparatus also comprises a user input device for sending a command to initiate placement of a timed trade order, and an indicator being dynamically displayed in one of the plurality locations of the first screen region and corresponding to the timed order. In one example embodiment, the indicator dynamically moves over time relative to the second axis indicating a time until the order will be automatically sent to a computerized matching process.

20 Claims, 3 Drawing Sheets

TIME MARKET GRID INTERFACE

TECHNICAL FIELD

The present invention relates generally to the electronic trading. More specifically, it relates to a system and method for trading tradeable objects in an electronic trading environment.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may connect to an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Client entities, such as computers being used by traders to trade, are typically connected to an electronic exchange by way of a communication link to facilitate electronic messaging between the trading entities and the exchange. The messaging may include market information that is distributed from the electronic exchange to traders, as well as orders, quotes, acknowledgements, fills, cancels, deletes, cancel and replace, and other well-known financial transaction messages. Although the amount or type of market information published by an electronic exchange often differs, there are typically some standard pieces of information. For instance, market information usually includes market depth. Market depth refers to quantities available at the inside market, e.g., quantities at the current lowest sell price and the current highest buy price, and can also refer to quantities available at other prices away from the inside market. In addition to providing order book information including price and quantity information, electronic exchanges can offer other types of market data such as the open price, settlement price, net change, volume, last traded price, last traded quantity, and order fill information.

Once a trading station at the client entity receives the market information, the market information may be displayed on the trading screen. Upon viewing the market information, traders can take certain actions including the actions of sending buy or sell orders to the electronic market, adjusting existing orders, deleting orders, or otherwise managing orders. Traders may also use software tools to automate these and additional actions.

To profit in electronic markets, market participants must be able to assimilate large amounts of data, and easily view and have control over any trader initiated orders. Thus, it is desirable to offer tools that can assist a trader in trading in electronic trading systems.

BRIEF DESCRIPTION OF THE DRAWINGS

Example embodiments are described herein with reference to the following drawings, in which.

DETAILED DESCRIPTION

I. Overview

It is beneficial to offer tools that can assist a trader in trading in an electronic trading environment. The example embodiments, among other things, are directed towards a graphical interface that can be used for displaying, managing, and placing trade orders, while also providing a trader current market information.

One example method includes displaying a first screen region having a plurality of locations, with each location corresponding to a price level along a price axis and further corresponding to a time along a time axis. The example method then includes receiving a command to initiate placement of a timed trade order to buy or sell a tradeable object, where the timed trade order is an order associated with a price parameter and a time parameter. According to one example embodiment, the command may be received upon selecting a location corresponding to the price and time parameters in the first screen region. The example method further includes displaying a first indicator corresponding to the timed trade order in one of the plurality of locations in the first screen region, where the location corresponds to the price parameter and the time parameter. The first indicator is then dynamically moved over time to a new location relative to the time axis.

Another example method includes displaying a second screen region having a plurality of locations, where each location in the second screen region corresponds to a price level along the price axis. Upon receiving a command to initiate placement of an immediate execution order to buy or sell the tradeable object, where the order is associated with a price parameter, the method further includes, dynamically displaying a second indicator in one of the plurality of locations in the second screen region to represent the immediate execution order. Similarly to the timed trade order that can be initiated by selecting a location in the first screen region, the command to initiate placement of the immediate execution order can be initiated by selecting a desired location in the second screen region.

Additionally, the second screen region may be used to show where an order is resting in the exchange order queue. So, for example, once an order is resting in the exchange's order book (it does not matter whether the order was initiated as a timed order or through immediate execution) an indicator may be displayed in the second region to show where the order is in the exchange order queue relative to other orders/quantities, if there are any.

While different aspects of the invention are described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

Figure 1:
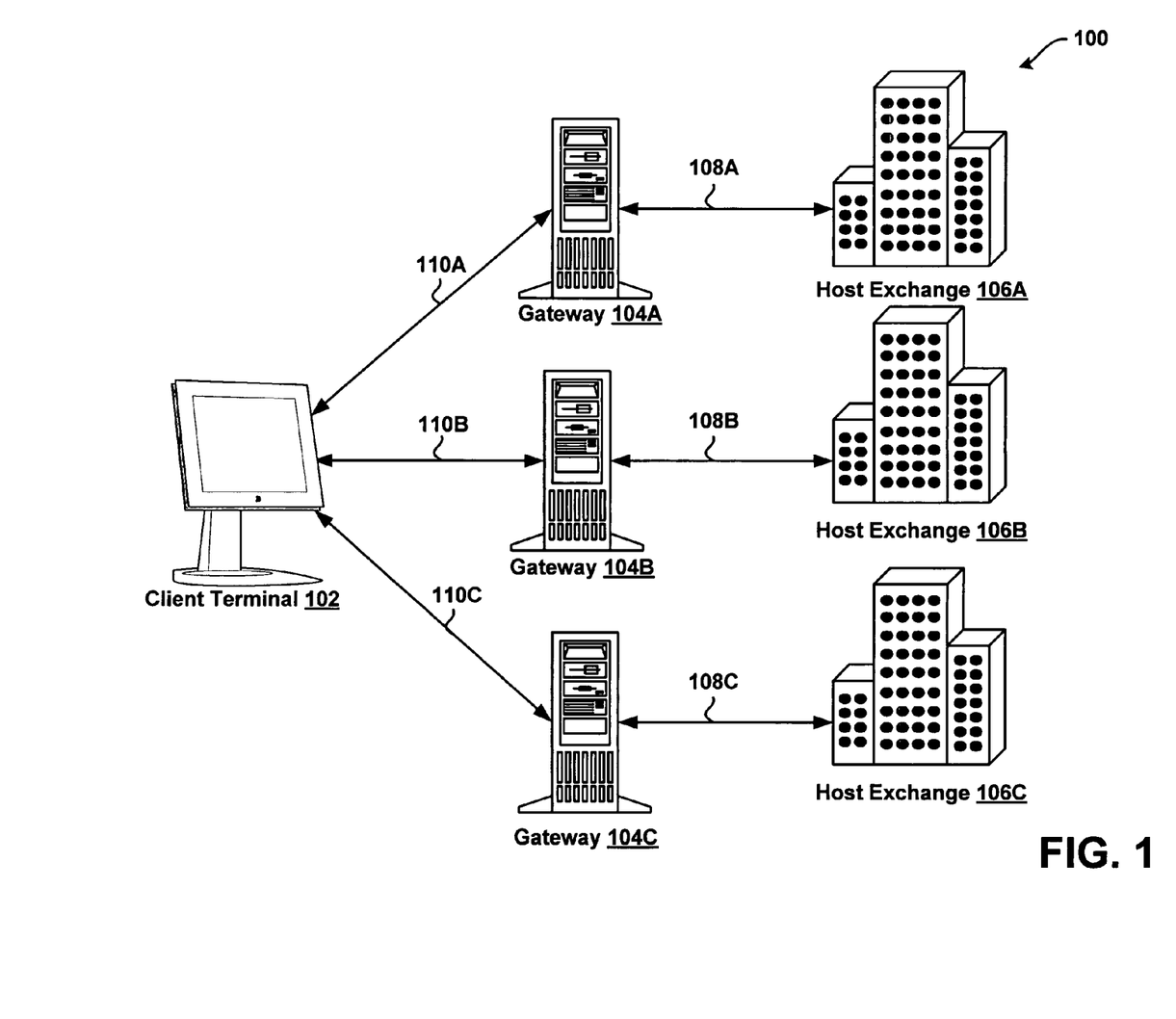
FIG. 1 is a block diagram illustrating an example network configuration for a communication system utilized to access one or more exchanges.

In an electronic trading environment, when a trader selects a tradeable object, the trader may access market data related to the selected tradeable object(s). Referring to FIG. 1, an example communication that might occur between an electronic exchange and a client terminal in accordance with the example embodiments is shown. During a trading session, market data, in the form of messages, may be relayed from host exchanges 106A-106C over communication links 108A-C and 110A-C to a client terminal generally indicated as 102. As illustrated in FIG. 1, intermediate devices, such as gateway(s) 104A-C, may be used to facilitate communications between the client terminal 102 and the host exchanges 106A-C. It should be understood that while FIG. 1 illustrates each host exchange 106A-106C communicating with the client terminal 102 via a separate gateway, a single gateway could be used to provide communication between the client terminal 102 and multiple exchanges. Alternatively, multiple gateways could be assigned to each electronic exchange.

As mentioned earlier, market information provided by an exchange may contain data that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market information may also include quantities available for trading the tradeable object at certain buy price levels and quantities available for trading the tradeable object at certain sell price levels other than the inside market price levels.

In addition to providing the tradeable object's order book information, electronic exchanges can offer different types of market information such as a total traded quantity value for each price level, an opening price, a last traded price, a last traded quantity value, a closing price, or order fill information. It should be understood that market information provided from an electronic exchange could include more or fewer items depending on the type of tradeable object or the type of exchange. Also, it should be understood that the messages provided in the market information may vary in size depending on the content carried by them, and the software at the receiving end may be programmed to understand the messages and to act out certain operations.

A trader may view the information provided from an exchange via one or more specialized trading screens created by software running on the client terminal 102, the embodiments of which will be described in relation to subsequent sections. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken and send the generated messages to each respective exchange. It should be understood that different types of messages or order types can be submitted to the host exchanges 106A-C, all of which may be considered various types of transaction information. Once generated, user action messages may be sent from the client terminal 102 to the host exchange(s) over communication links 110A-C and 108A-C.

III. System Function and Operation

Figure 2:
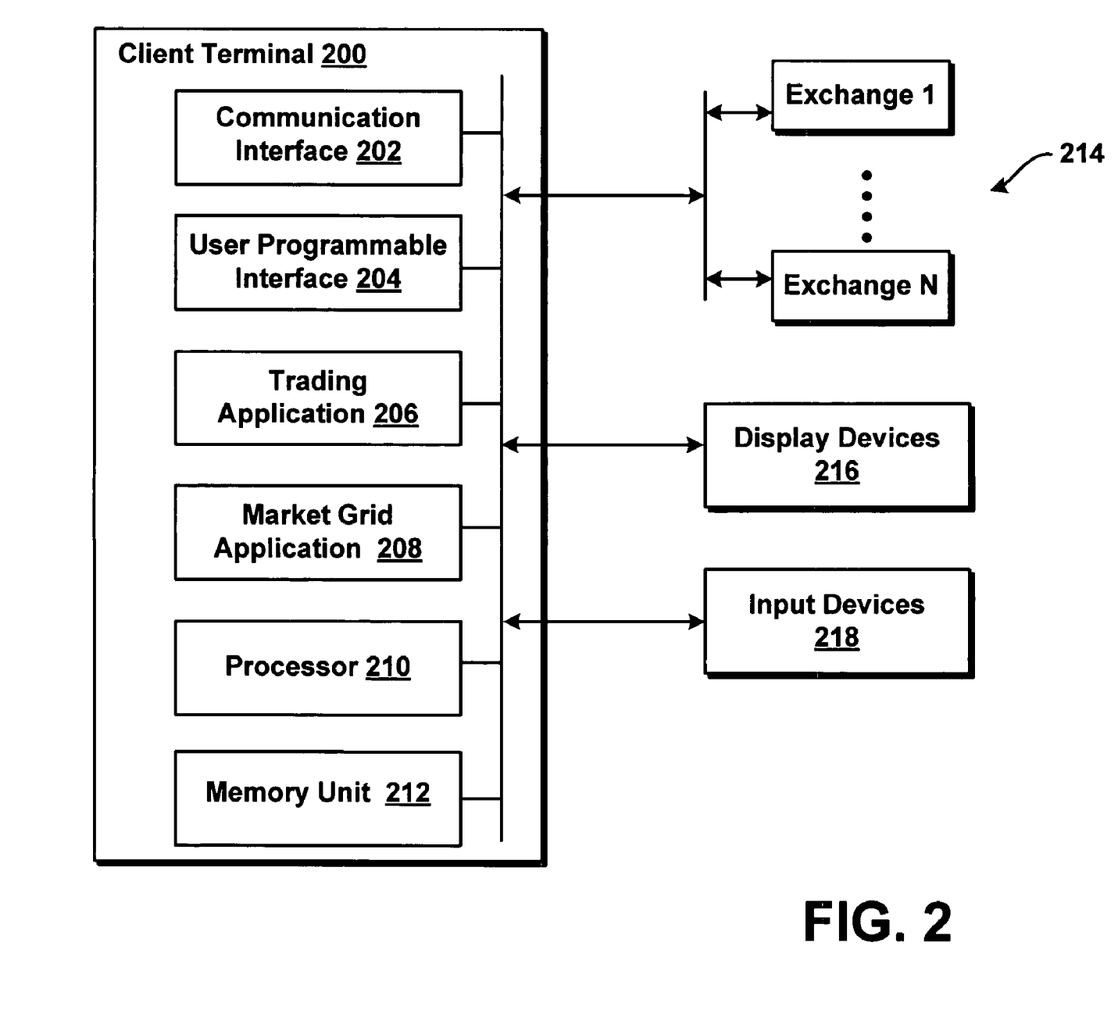
FIG. 2 is a block diagram illustrating a client terminal with a number of layers defining different stages that may be used to implement the example embodiments described herein.

FIG. 2 is a block diagram illustrating a client terminal 200 with a number of layers defining different stages that may be used to implement various example embodiments that will be described in greater detail below. The layers include a communication interface 202, a user programmable interface 204, a trading application 206, a market grid application 208, a processor 210, and a memory unit 212.

The example client terminal 200 can include any type of computing device, such as a personal computer, laptop computer, hand-held computer, or any other devices that have network access. The communication interface 202 allows the client terminal 200 to interact with the trader and to generate contents and characteristics of a trade order to be sent to one or more of a plurality of electronic exchanges 214. In one example embodiment, the user programmable interface 204 allows a user to enter any configuration parameters to be used by the market grid application 208 or the trading application 206. The user programmable interface 204 may include any type of interface. For example, the user programmable interface 204 may be a command-driven interface, a graphical user interface that takes advantage of computer graphics, or the combination thereof. The graphical user interface may include one or more windows that can be moved around the display screen, and their size and shape can be changed as the user wishes. A window may in turn include icons that represent commands, files, or more windows. Alternatively, rather than using a user programmable interface at the client terminal, an intelligent communication interface could be used instead. In such an embodiment, a third party application could input one or more variables into the trading application 206 and the market grid application 208, and the applications could operate based on the specified variables. The types of variables and functions will be described in greater detail below.

In one embodiment, the user programmable interface 204 can be implemented in a software module or processor. The user programmable interface 204 can be a routine, a data structure, or the combination thereof, stored in the memory unit 212, and a microprocessor (coupled to the user programmable interface) may perform the functions of the user programmable interface described herein.

As mentioned in an earlier paragraph, the user programmable interface 204 may take a format of different windows, which may be displayed via the display devices 212 of the client terminal 200, such as a screen of the client terminal 200. The windows can include as many functional icons as the user requests, and each icon may include an image displayed on the screen to represent an element that can be manipulated by the user. Specific examples of icons and functionality will be described below.

Information being provided by the trading application 206 may be displayed to a trader via the display devices 216, and may allow a trader to view market data, enter, cancel, change, and view trade orders. Preferably, the trading application 206 and the market grid application 208 have access to market information from the host exchanges 214, and allow a trader to view market data, enter, change, and cancel orders, and view order related information. A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the example embodiments is not limited by the type of terminal or device used, and is not limited to any particular type of a trading application.

Portions of X_TRADER® and the MD Trader™-style display are described in U.S. Pat. No. 6,772,132, entitled "Click Based Trading With Intuitive Grid Display of Market Depth," filed on Jun. 9, 2000, U.S. patent application Ser. No. 09/971, 087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

In the embodiment illustrated in FIG. 2, the trading application 206 and the market grid application 208 are shown as two separate applications. However, it should be understood that the functionality of both applications could be combined into a single application as well. In one example embodiment, the market grid application 208 allows a trader, among other things that will be described in greater detail below, an alternative means to view market, manage working orders, and enter new orders.

IV. Graphical User Interface

Figure 3:
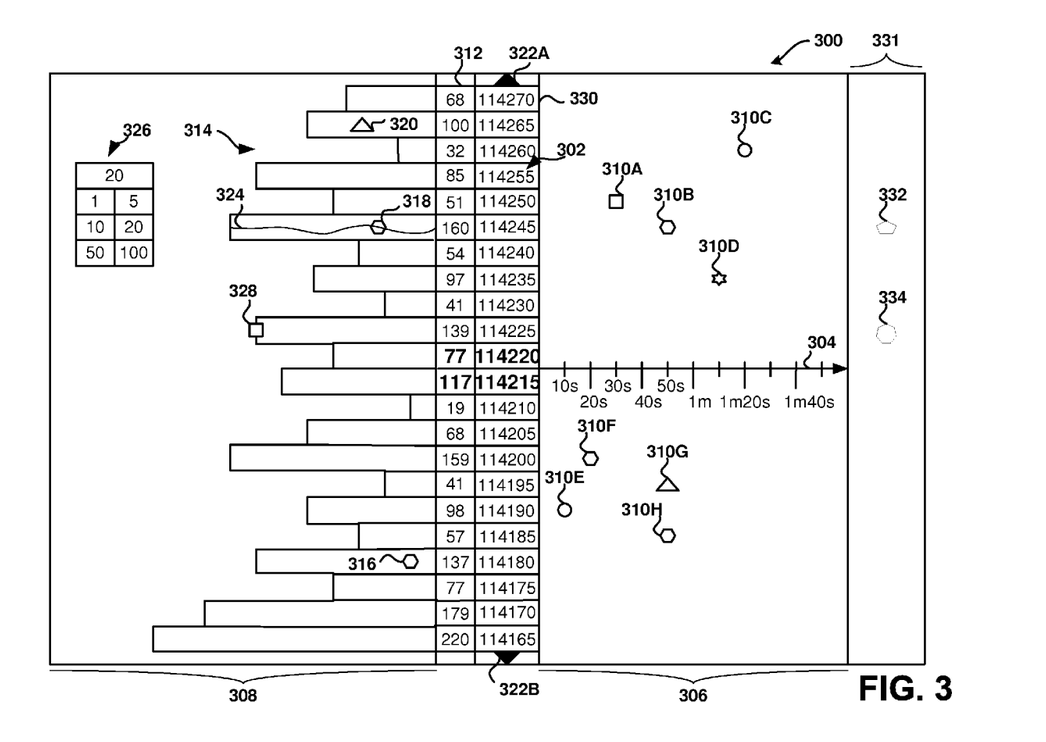
FIG. 3 is a block diagram illustrating a market grid interface according to one example embodiment.

FIG. 3 is a block diagram illustrating an example market grid interface 300 that can be used for order entry and order management according to one example embodiment.

The example market grid interface 300 includes a price axis 302 and a time axis 304. According to one example embodiment, the price axis 302 corresponds to price levels or some other derivative of price, such as yield or volatility, associated with a tradeable object. The price axis 302 shows price levels in one tick increments; however, different tick increments could also be used based on user-configuration. According to one example embodiment, the price axis 302 may be of a static type, as described in the U.S. Pat. No. 6,772,132, entitled "Click Based Trading With Intuitive Grid Display of Market Depth," the contents of which have been incorporated above by reference. Accordingly, the values in the price column 302 are static, such that, for example, they do not normally change position unless a re-centering, re-positioning, or other user initiated commands (such as selecting of one of the scroll buttons 322A or 322B) are received. As will be described later, bid and ask quantity indicators are oriented along the price column 302 in a column 312. Then, when changes in the market occur, the trader can visualize them by watching indicators in the column 312 move along the price column 302, while the price indicators in the price column 302 remain static.

To distinguish the inside market prices from other prices displayed on the price axis 302, the inside market prices could be displayed using special font styles, highlighting, or color coding the cells corresponding to the inside market prices. The best bid/ask prices of 114215 and 114220 in FIG. 3 are shown in bold and use the increased font size so that they can be easily distinguished from other market depth prices. The cells corresponding to prices and/or quantities could be also color-coded based on whether they correspond to ask or bid prices/quantities. For example, red could be used in relation to ask quantity cells, and blue could be used in relation to buy quantity cells. However, different colors could be used as well based on the user preferences.

The time axis 304 corresponds to a future time period as well as the current time. The time axis 304 can be a continuous (or discontinuous) time axis with a linear or non-linear time scale. The time axis in FIG. 3 uses a scale with 10 seconds increments. (However, it is understood that any scale having any number of increments may be used—for example, a linear or non-linear scale with any number of increments could be used.) For example, the time axis 304 could be divided into a plurality of regions that can form a continuous axis, with each region having its own linear time scale. In such an embodiment, the first region could correspond to the first future minute, and the time scale could use the time increments of 10 seconds. Then, the second region could correspond to the next 9 minutes, with a time scale set to 1 minute each, thus, the two regions creating a continuous 10 minutes interval. Additional regions could be similarly created to show additional future time periods. It should be understood that different time intervals could be defined in relation to each region, and different time increments could be used in relation to each time interval based on the user's preferences.

According to one example embodiment, the graphical interface 300 can display current market conditions, such as current quantity values available at a plurality of price levels corresponding to the price axis 302. The graphical interface 300 includes a quantity column 312 that displays the current inside market bid/ask quantities, in this example, the quantities of 117 and 77 associated with the price levels 114215 and 114220, as well as market depth quantities at other price levels. While FIG. 3 illustrates a single quantity column 312, it should be understood that more than one column could be used as well. For example, two separate quantity columns could be used, the first column corresponding to bid quantities, and the second column corresponding to ask quantities. Also, it should be understood that the example interface 300 is not even limited to using columns, and different types of display could be used as well.

As the market conditions change, the quantity indicators can dynamically move relative to the price axis 302 so that a trader can quickly tell if the market has moved up or down in value. Locations of the bid and ask cells along the price axis 302 are fixed in relation to the price levels. For example, the location corresponding to the current best ask quantity is fixed to the current best ask price of 114220, so that as the inside market goes up or down, the user can quickly view this change. A user could also reposition the market along the price axis 302. Upon repositioning, the locations corresponding to the quantity cells will become fixed in relation to a new set of price levels. It should be understood that re-positioning of the market information may occur automatically or manually. Also, it should be understood that the locations of the price column 302 and the quantity column 312 are not fixed, and the columns could be rearranged. For example, the price axis 302 could be displayed horizontally, or yet at some other angle.

In addition to displaying quantity values numerically via the quantity column 312, the quantities available at each price level could be displayed in a graphical format as well. FIG. 3 illustrates market depth in a bar chart format 314, where the length of each bar displayed horizontally to a price level on the price axis 302 may represent the quantity available at the corresponding price level. It should be understood that the length of each bar could be based on a user-defined scale. Also, different chart types could be used as well to represent the quantity values graphically.

The graphical interface 300 could also illustrate different parameters corresponding to the current market conditions using indicators. Such parameters could include a last traded price, an opening price, a yesterday's closing price, a last traded quantity, and many others. The graphical interface 300 could also illustrate historical data, such as historical quantities that were traded during a predetermined time period in relation to each price level. Also, rather than showing historical quantity values, a historical quantity graph could be displayed in relation to each price level such that a trader can get an idea of traded quantity variations over a predetermined time period in the past. One such graphical representation of the historical data corresponding to the last traded quantity is shown in relation to the price level 114245 at 324. It should be understood that different methods could be used to show traded quantity variations. For example, the mid-point of the height of the total traded quantity bar displayed in relation to a specific price level may correspond to a specific quantity value, such as a quantity that was traded during a predetermined time interval when the market opened, or yet during some other user-configurable time period.

According to one example embodiment, the graphical interface 300 is divided into two order entry regions, a timed order entry area 306 and an immediate order entry area 308. A trader can use the timed order entry area 306 to place timed orders, e.g., orders that will be placed in the market at some user-selected time in the future. It should be understood that two different approaches could be used for sending the timed orders to an electronic exchange, and the approaches could be exchange specific. According to one approach, an order can be sent for execution to an exchange only when a predetermined time defined in relation to the timed order is detected. Alternatively, a timed order could be sent to an exchange when it is configured, and the exchange could forward the order to its execution engine when the predetermined time defined in relation to the order is detected. Unlike the timed order entry area 306, the immediate order entry area 308 enables a trader to submit orders to an electronic exchange for the immediate execution.

According to one example embodiment, a trader could place orders via the two regions, such as by selecting a point in one of the regions with a user input device. If the order is placed via the immediate order entry region 308, the y-coordinate of the selected point can be mapped to a specific price level in the price column 302 corresponding to the y-coordinate level of the selected point. Similarly, the price axis 302 and the time axis 304 can be used by a trader as y- and x-coordinate references for mapping selected points on the timed order interface 306. For example, when a trader selects a point in the timed order entry area 306, a y-coordinate of the selected point could be mapped to a price level on the price axis 302, and an x-coordinate could be mapped to a specific time on the time axis 304. For example, an indicator 310D corresponds to an order at the price level of 114235, with the time remaining to the order execution currently set to 1 minute and 10 seconds.

It should be understood that a trader could submit orders via the order entry areas 306 and 308 using many different methods. For example, a trader could use an input device, such as a mouse, to position a cursor in a desired location, and upon selection of the mouse button (such as upon the down stroke of the mouse button or upon release of the button), an order can be sent to an electronic exchange—such as when the order entry is detected in relation to the immediate order entry region 308. According to one example embodiment, buttons of an input device can be programmed so that when a particular button is pressed, it can activate an action of sending a buy order to a matching engine at an exchange, and, when another button is pressed, it activates sending a sell order. Also, a trader could submit an order using the bid and ask quantity display region 312. In an embodiment where two separate columns are used for bid quantities and ask quantities, an order is a buy order or a sell order depending on whether the user input is detected in the bid display region or the ask display region. The example methods for order entry are further described in the applications referenced above as well as the co-pending U.S. patent application Ser. No. 10/376,417, entitled "A System and Method for Trading and Displaying Market Information in an Electronic Trading Environment, filed on Feb. 28, 2003, fully incorporated herein by reference.

The graphical user interface could also provide a number of selection icons to be used by a trader to activate different order types, such as a stop order indicator, a stop-limit order indicator, a limit order indicator, or yet some other order types. In such an embodiment, a trader could first select an icon corresponding to a desired order type, and then use the user input device to drag the indicator to a desired location in one of the regions 306 or 308. It should be understood that graphical indicator or icons displayed in the regions of the graphical interface 300 can take many different formats and could be generated using many different methods.

A trader can use a quantity pad 326 to preset a quantity for any order to be entered via one of the regions. The top cell of the quantity pad 326 defines a default quantity, which in the embodiment shown in FIG. 3 corresponds to the quantity of 20. It should be understood that a trader could change the default quantity by selecting a different quantity via the quantity pad 326 or manually entering a desired quantity value in the default quantity field. The quantity pad 326 could be configured to use different operation modes, such as an "add" mode, a "calc" mode, or yet some other modes. If the "add" mode" is selected, and a trader sequentially selects quantities using the quantity pad, the selected quantities could be added. For example, if a trader selects 1, 5, and 10 with the "add" mode activated, the quantity could be set to 16. Then, in the "Calc" mode, the selection of 1, 5, and 10 would result in the overall quantity of 1510. It should be understood that different operation modes could be defined as well in relation to the quantity pad, and a trader could modify the quantities available for selection on the quantity pad 326 based on the trader's trading strategy. For example, the quantity pad 326 could be configured to provide larger quantity values when a trader's trading strategy involves submitting large quantity orders.

As mentioned earlier, a trader could enter timed orders via the timed order entry region 306. It should be understood that different order types could exist for timed orders, and the graphical interface 300 could provide a plurality of selection icons corresponding to different timed order types. For example, a timed order could include a single order having an order quantity, a price, and a preset time trigger that, when detected, can trigger submission of the order to a matching engine. In addition to sending single timed orders, a trader could also submit different timed order types. For example, a user may wish to break up an order having a large order quantity into a plurality of smaller quantity orders that could then be submitted to an exchange over a set period of time upon detecting an initial time trigger. According to one example embodiment, such orders could be submitted to the exchange based on user-defined time intervals. Alternatively, each subsequent order can be sent to an exchange when the preceding order is filled, and the process may continue until the total order quantity gets filled. Each order could also have pre-configured limitations, such as a predefined time until the order should be kept active. For example, if a working order is associated with such a limitation, it can be deleted from an exchange if it is not filled until the predefined time.

When a trader enters an order via any of the two regions of the graphical interface 300, a working order indicator can be displayed in the immediate order entry region 308 and/or the timed order entry region 306. For example, when an order is entered via the timed order entry region 306, an order icon could be displayed in the timed order entry region 306. Several such timed order indicators 310A-310H are illustrated in the timed order region 306. According to one example embodiment, the indicators could be color coded to indicate if a timed order is a buy order or a sell order. Also, a position of the indicator in the timed order region 306 can be used to determine a price level at which the corresponding order was placed as well as the time remaining until the order will be placed in the market. For example, referring to the indicator 310D, a timed order corresponding to the indicator 310D has been placed at the price level of 114235, and the time remaining for the order to be placed in the market is 1 minute and 10 seconds.

Some traders may use a plurality of accounts for trading. In such an embodiment, it would be beneficial for a trader to be able to view which orders correspond to different accounts. Therefore, in addition to color coding the indicators to identify if the order was a buy or a sell, different indicators could be used to identify the association of each order with a specific account. For example, different indicator shapes could be used to differentiate a plurality of trading accounts. According to such an embodiment, referring to FIG. 3, the order indicators 310B, 310F, and 310H could correspond to three orders that were entered using the same account. Alternatively, rather than using shapes, different colors could be assigned to different accounts, and the order indicators could be color-coded to distinguish between different accounts, while buys and sells are distinguished using different shapes.

The use of different indicator types in relation to a plurality of accounts could be especially beneficial for brokers or other traders who manage a large number of orders while using more than one trading account. The interface 300 could allow for selection of different accounts, which in turn would result in display of only the order indicators that correspond to the selected account(s). It should be understood that a number of filters could be provided via the interface 300, and the traders could select one or more filters to view a desired set of indicators.

In addition to using different indicator types or colors to distinguish between trading accounts or order types, the displayed indicators could have different sizes to indicate an order quantity corresponding to each order. For example, the sizes of the indicators could be based on user configuration. According to one example embodiment, a bigger indicator size may correspond to a larger order quantity. The visual representation of the order quantity may provide a quick risk assessment for each order.

According to one example embodiment, the timed order indicators displayed in the timed order region 306 are dynamic. More specifically, the position of each indicator at any point in time in relation to the time axis is dynamically updated and preferably reflects the time remaining until the order execution. For example, the position of the indicator 310D reflects that the order will be sent to a matching engine in 1 minute and 10 seconds. As the remaining execution time changes, the indicator 310D is preferably repositioned to reflect the remaining time until order execution and to give the user time to cancel or modify one or more parameters corresponding to the order.

The timed order indicators could be also repositioned based on user initiated actions. For example, a user could move a timed order indicator to increase or decrease the time remaining until the order associated with the indicator will be submitted to a matching engine at an electronic exchange. It should be understood that different order modification modes could be selected when order parameters are changed by moving order indicators. According to one example embodiment, when a user selects an order indicator, such as clicks on the order indicator, and then starts moving the indicator, an order associated with the order indicator can be immediately cancelled. Alternatively, the order associated with the selected indicator does not have to be cancelled immediately upon detecting the selection and movement of the indicator, but rather the order can be cancelled when the order indicator is placed in another location of the interface 300 corresponding to the desired order parameters. It should be understood that the user could select the mode of operation to be used in relation to the order indicators, and different modes of operation could be provided as well.

In addition to changing a time period remaining until order execution, a trader could change the price of any timed order by moving the order indicator to a different price level. Such a movement would result in canceling a timed order associated with the initial position of the indicator, and configuring a second timed order based on the new position of the indicator. As an order indicator is moved between price levels, a price level could be displayed in relation to the indicator being moved so that a user can be assured that dropping the indicator at a specific location will result in placing a new order at a desired price level. In addition to displaying the price level, the time value corresponding to the current location of the indicator could be displayed as well.

Further, it should be understood that the example embodiments are not limited to selecting and moving a single indicator. Alternatively, a user could simultaneously select multiple timed order indicator and move them around to desired price levels and/or desired points in time.

A user could also assign certain actions to result in a quick deletion of the orders from the electronic exchange. For example, a right-click action or a left-click action on an order indicator could be used to quickly delete an order associated with the order indicator. It should be understood that the same methods could be used in relation to the order indicators in the timed order region 306 and the immediate fill region 308.

Alternatively, dragging and dropping an order indicator in a specific area of the graphical interface 300 could result in deletion of the order as well.

The timed order region 306 also includes an execution threshold line 330. According to one example embodiment, the timed order indicators move toward the execution threshold line 330 as the time remaining to each order's execution decreases. When a timed order indicator reaches the execution threshold line 330, an order associated with that indicator will be automatically submitted to a matching engine at an electronic exchange for execution.

An alert mechanism could be provided in relation to the timed order entry region 306 so that a trader can be alerted when one or more timed order indicators are close to reaching the execution threshold line 330. It should be understood that the alert mechanism could take many different forms, including sound alerts, visual alerts, or the combination thereof. For example, when an alert associated with a certain indicator is triggered, the indicator could start flashing and/or a predetermined audio signal could be played. A user could also preprogram the time when the alerts should be activated in relation to the order indicators, and the alerts don't necessarily have to be applied to all order indicators. For example, a user could activate the alerts only in relation to some order indicators, such as the indicators corresponding to orders with large order quantities or orders corresponding to certain trading accounts. Also, more than one alert could be configured in relation to a single order indicator, such that different alerts could be activated at predefined time intervals before execution of an order associated with the indicator.

As mentioned earlier, when the timed order indicator reaches the execution threshold line 330, an order associated with the indicator will be submitted to a matching engine at an electronic exchange. When the order is sent to a matching engine, the order indicator is moved to the immediate fill order area 308. More specifically, the order indicator is displayed in relation to a depth bar corresponding to an order's price. For example, an order icon 328 corresponds to an order that was entered at a price level of 114225.

Also, the position of the order indicator in the market depth bar may provide an indication as to the position of the order in the order queue at an electronic exchange. For example, the position of the indicator 328 shows that the order corresponding to the indicator 328 is probably at the end of the order queue. Then, as the market depth changes, the position of the indicator can change to indicate an estimated order position in the order queue. The example methods for estimating order position in an order queue are described in the U.S. patent application Ser. No. 10/452,567, entitled "System and Method for Estimating Order Position," the contents of which are fully incorporated herein by reference. Alternatively, the position in the queue can be computed based on exchange provided data. However, it should be understood that different order position estimation methods could be used as well.

In addition to showing estimated positions of orders in the order queue, additional information could be provided in relation to the order indicators as well. According to one example embodiment, a time in the market indicator could be shown in relation to an indicator showing an estimated queue position of an order so that a trader can easily determine how long each order has been in the market. It should be understood that the time in market indicator could take many different formats, including simply color-coding the indicator showing an estimated position of an order in an order queue. Alternatively, a time value could be displayed in relation to the indicator showing the position of the order in an order queue, and the time value could be displayed continuously or could be activated upon detecting a certain user input, such as a user placing a cursor corresponding to a user input device in relation to the desired indicator.

According to one example embodiment, a trader could also move the indicators displayed in the market depth regions. For example, a trader could move the order indicators to the back of the queue by moving the indicators to the left of the current indicator position. Such a movement may effectively result in canceling a pending order in the order queue and submitting a new order that will be positioned at the end of the order queue.

In addition to showing the estimated position of the order in the order queue, a user could also view additional order parameters by either selecting an order indicator or positioning a user input device icon in relation to the order indicator. By doing that, a user may trigger activation of another window that can display order details, such as an order quantity, a time period that has passed since the order has been sitting in the order queue, or yet some other order parameters that a user wishes to view.

While the example embodiments described above refer to the user-initiated indicator movements in relation to a single interface, it should be understood that when a trader views orders and trades using a number of graphical interfaces, such as the one described in FIG. 3, a trader could potentially move order indicators displayed in relation to one interface to another interface. Also, it should be understood that order indicators corresponding to more than one tradeable object could be displayed in relation to a single trading interface as well.

In addition to the timed order region 306 and the immediate fill region 308, the graphical interface 300 includes a virtual order region 331. According to one example embodiment, the virtual order region 331 can be used to display virtual orders 332, 334 that can be triggered upon detecting one or more preconfigured conditions. It should be understood that the conditions could take many different user configured formats, and could be based on market data, news, or yet other data from different sources. When one or more conditions preconfigured for a virtual order is triggered, the virtual order can become a timed order, which would then trigger a display of an order indicator in the timed order region 306. Alternatively, when the condition(s) associated with a virtual order are satisfied, the virtual order could be immediately placed in the market, which, in turn, would cause repositioning of an order indicator from the virtual order region 330 to either the immediate fill region 308 or the timed order region 306 depending on the order configuration.

It should be understood that the graphical interface 300 described above is not limited to the layout shown in FIG. 3, and different embodiments are possible as well. For example, the immediate fill region 308 could be positioned in the bottom half of the graphical interface with the price axis running horizontally, and the timed order region 306 could be positioned in the upper half, with the time axis running vertically, or vice versa. Different embodiments could be possible as well. Also, it should be understood that the values on either axis could increase/decrease in any user-defined direction, and the example embodiments are not limited to any specific configuration.

It should be emphasized that the above-described embodiments of the present invention, particularly, any "preferred" or "present" embodiments, are merely possible examples of implementations. Many variations and modifications may be made to the above-described embodiment(s) of the invention without departing substantially from the spirit and principles of the invention. All such modifications and variations are intended to be included within the scope of the present invention and protected by the following claims.

It will be apparent to those of ordinary skill in the art that methods involved in the system and method for market grid interface may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A trading apparatus for trading a tradeable object at an electronic exchange, comprising:
    a microprocessor;
    a graphical user interface coupled with the microprocessor comprising a first screen region having a plurality of locations, each location in the first screen region corresponding to one of a plurality of price levels along a price axis and corresponding to one of a plurality of times along a time axis;
    a user input device for sending a command to initiate placement of a timed trade order to buy or sell the tradeable object at a future time, wherein the command is received through an action of a user input device with a cursor of the user input device positioned over a location of the plurality of locations in the first screen region, the timed trade order associated with a price parameter indicating a price corresponding to the location and further with a time parameter corresponding to a time remaining until the timed trade order is to be submitted to a matching engine at the electronic exchange, wherein the price parameter and the time parameter are associated with the location of the cursor at the time of the action; and
    a first indicator being dynamically displayed in the location in the first screen region, the first indicator representing the timed trade order and the location of the first indicator corresponding to the price parameter and the time parameter, wherein the first indicator dynamically moves over time, relative to the time axis, to a new location as the time remaining until the timed trade order is submitted to the matching engine changes.

2. The trading apparatus of claim 1, wherein the price axis is perpendicular to the time axis.

3. The trading apparatus of claim 1, wherein the new location corresponds to a subsequent time compared to the time of the location.

4. The trading apparatus of claim 1, wherein the command to initiate placement of a timed trade order comprises selecting the location in the first screen region, wherein the selected location is based on the price parameter and the time parameter.

5. The trading apparatus of claim 1, wherein the user input device is further used for sending a change command to initiate a change in the price parameter, the time parameter, both the price parameter and the time parameter, or to cancel the timed trade order.

6. The trading apparatus of claim 5, wherein the change command to initiate the change comprises moving the first indicator to a desired location in the first screen region.

7. The trading apparatus of claim 1, further comprising:
    an input interface for receiving electronic market data from a computerized matching process, the electronic market data associated with the tradeable object, wherein the market data is displayed in relation to the price axis.

8. The trading apparatus of claim 1, further comprising:
    a second screen region of the graphical user interface having a plurality of locations, each location in the second screen region corresponding to a price level along the price axis;
    the user input device for sending a command to initiate placement of an immediate execution order to buy or sell the tradeable object, the immediate execution order associated with a price parameter and being sent for execution to the matching engine at the electronic exchange upon receiving the command, wherein the command is received through an action of the user input device positioned over a location in the plurality of locations in the second screen region, wherein the price parameter of the immediate execution order is associated with the location of the cursor at the time of the action in the second screen region;
    a second indicator being dynamically displayed in one of the plurality of locations in the second screen region, the second indicator representing the immediate execution order, and the location of the second indicator corresponding to the price parameter associated with the immediate execution order.

9. The trading apparatus of claim 8, wherein the second screen region comprises a market depth indicator in relation to the second indicator, and the location of the second indicator in relation to the market depth indicator shows an approximate location of the immediate execution order in an order queue at a computerized matching process.

10. The trading apparatus of claim 8, wherein the first indicator is moved from the first screen region to the second screen region upon detecting that a time remaining until execution associated with the timed trade order has been reached.

11. A method for trading a tradeable object at an electronic exchange, comprising: displaying by a trading apparatus a first screen region of a graphical user interface having a plurality of locations, each location in the first screen region corresponding to one of a plurality of price levels along a price axis and further corresponding to one of a plurality of times along a time axis; receiving by the trading apparatus a command to initiate placement of a timed trade order to buy or sell at a future time the tradeable object, wherein the command is received through an action of a user input device with a cursor of the user input device positioned over a location of the plurality of locations in the first screen region, the timed trade order associated with a price parameter indicating a price corresponding to the location and further with a time parameter corresponding to a time remaining until the timed trade order is to be submitted to a matching engine at the electronic exchange, wherein the price parameter and the time parameter are associated with the location of the cursor at the time of the action; dynamically displaying by the trading apparatus a first indicator in the location in the first screen region, the first indicator representing the timed trade order, and the location of the first indicator corresponding to the price parameter and the time parameter; dynamically updating by the trading apparatus the location of the first indicator relative to the time axis to a new location as the time remaining until the timed trade order is submitted to the matching engine changes; and sending by the trading apparatus an order to the matching engine at the electronic exchange when the time remaining until the timed trade order is submitted to the matching engine reaches zero.

12. The method of claim 11, wherein the price axis is perpendicular to the time axis.

13. The method of claim 11, wherein the new location corresponds to a subsequent time compared to the time associated with the location.

14. The method of claim 11, wherein sending a command to initiate placement of a timed trade order comprises selecting the location in the first screen region, wherein the selected location is based on the price parameter and the time parameter.

15. The method of claim 11, further comprising:
sending a change command to initiate a change in the price parameter, the time parameter, or both the price parameter and the time parameter associated with the timed trade order, wherein the change command comprises moving the first indicator to a desired location in the first screen region.

16. The method of claim 11, further comprising:
receiving electronic market data from a computerized matching process, the electronic market data associated with the tradeable object; and
displaying market data in relation to the price axis.

17. The method of claim 11, further comprising: displaying a second screen region of the graphical user interface having a plurality of locations, each location in the second screen region corresponding to one of a plurality of price levels along the price axis; sending a command to initiate placement of an immediate execution order to buy or sell the tradeable object, the immediate execution order associated with a price parameter and being sent for execution to the matching engine at the electronic exchange upon receiving the command, wherein the command is received through an action of the user input device positioned over a location in the plurality of locations in the second screen region, wherein the price parameter of the immediate execution order is associated with the location of the cursor at the time of the action in the second screen region; and dynamically displaying a second indicator in one of the plurality of locations in the second screen region, the second indicator representing the immediate execution order, and the location of the second indicator corresponding to the price parameter associated with the immediate execution order.

18. The method of claim 17, wherein sending the command comprises selecting the location in the second screen region, the selected location corresponding to the price parameter associated with the immediate execution order.

19. The method of claim 17, further comprising: moving the first indicator from the first screen region to the second screen region upon detecting that a time remaining until execution associated with the timed trade order has been reached.

20. A computer readable medium containing program instructions for causing a microprocessor to execute a method for use by a trader in an electronic trading system that includes at least one computer terminal connected over a network to at least one electronic exchange, comprising: displaying a first screen region of a graphical user interface having a plurality of locations, each location in the first screen region corresponding to one of a plurality of price levels along a price axis and further corresponding to one of a plurality of times along a time axis; displaying a second screen region of the graphical user interface having a plurality of locations, each location in the second screen region corresponding to one of the plurality of price levels along the price axis; sending a command to initiate placement of a timed trade order to buy or sell at a future time a tradeable object, wherein the command is received through an action of a user input device with a cursor of the user input device positioned over a location of the plurality of locations in the first screen region, the timed trade order associated with a price parameter indicating a price corresponding to the location and further with a time parameter corresponding to a time remaining until the timed trade order is to be submitted to a matching engine at the electronic exchange, wherein the price parameter and the time parameter are associated with the location of the cursor at the time of the action; dynamically displaying a first indicator in the location in the first screen region, the first indicator representing the timed trade order, and the location of the first indicator corresponding to the price parameter and the time parameter; dynamically updating the location of the first indicator relative to the time axis to a new location as the time remaining until the timed trade order is submitted to the matching engine changes; sending a command to initiate placement of an immediate execution order to buy or sell the tradeable object, the immediate execution order associated with a price parameter and being sent for execution to the matching engine at the electronic exchange upon receiving the command, wherein the command is received through an action of the user input device positioned over a location in the plurality of locations in the second screen region, wherein the price parameter of the immediate execution order is associated with the location of the cursor at the time of the action in the second screen region; and dynamically displaying a second indicator in one of the plurality of locations in the second screen region, the second indicator representing the immediate execution order, and the location of the second indicator corresponding to the price parameter associated with the immediate execution order.

* * * * *

UNITED STATES PATENT AND TRADEMARK OFFICE
CERTIFICATE OF CORRECTION

PATENT NO.       : 7,574,388 B1                                              Page 1 of 1
APPLICATION NO.  : 11/144134
DATED            : August 11, 2009
INVENTOR(S)      : Simeon C. Peebler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this

Seventh Day of September, 2010

David J. Kappos
*Director of the United States Patent and Trademark Office*